(12) United States Patent
Miyajima

(10) Patent No.: US 8,791,996 B2
(45) Date of Patent: Jul. 29, 2014

(54) IMAGE PROCESSING SYSTEM AND POSITION MEASUREMENT SYSTEM

(75) Inventor: Takayuki Miyajima, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 499 days.

(21) Appl. No.: 12/980,887

(22) Filed: Dec. 29, 2010

(65) Prior Publication Data
US 2011/0242311 A1 Oct. 6, 2011

(30) Foreign Application Priority Data

Mar. 31, 2010 (JP) ................................. 2010-084623

(51) Int. Cl.
*H04N 13/00* (2006.01)
*G06K 9/62* (2006.01)
*G01C 21/36* (2006.01)
*G06K 9/00* (2006.01)

(52) U.S. Cl.
CPC .......... *G06K 9/00791* (2013.01); *G06K 9/6255* (2013.01); *G01C 21/3602* (2013.01)
USPC ............................. 348/116; 382/209; 348/148

(58) Field of Classification Search
USPC ........................................................ 348/116
See application file for complete search history.

(56) References Cited

U.S. PATENT DOCUMENTS

| 7,133,768 B2 * | 11/2006 | Mukaiyama ................... 701/400 |
| 2008/0204557 A1 * | 8/2008 | Kubota et al. ................. 348/148 |
| 2009/0245657 A1 * | 10/2009 | Osugi ............................ 382/209 |

FOREIGN PATENT DOCUMENTS

| EP | 0 921 509 A2 | 6/1999 | |
| EP | 1 975 565 A2 | 10/2008 | |
| EP | 1975565 A2 * | 10/2008 | ............... G06K 9/00 |
| JP | A 2007-108043 | 4/2007 | |

OTHER PUBLICATIONS

Aug. 24, 2012 Search Report issued in European Patent Application No. 11150963.4.

* cited by examiner

*Primary Examiner* — Dave Czekaj
*Assistant Examiner* — Md Haque
(74) *Attorney, Agent, or Firm* — Oliff PLC

(57) ABSTRACT

An image processing system inputs a captured image of a scene viewed from a vehicle, extracts image feature points from the captured image, and obtains image-capturing situation information indicating a possibility that a specific subject is included in the captured image. The system determines importance degrees of the extracted image feature points based on the image-capturing situation information and generates image feature point data using the extracted image feature points based on the importance degrees. The system generates reference data by associating the image feature point data with image-capturing attribute information and creates a reference data database. The image-capturing attribute information includes an image-capturing position at which the image is captured to obtain the captured image corresponding to the image feature point data.

11 Claims, 4 Drawing Sheets

FIG. 3A
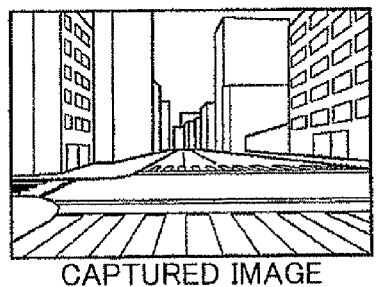
CAPTURED IMAGE
FIG. 3B
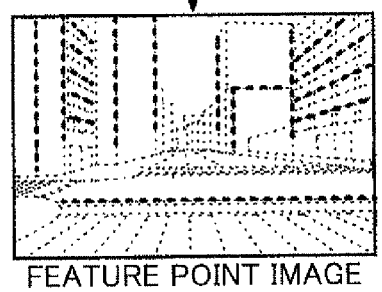
FEATURE POINT IMAGE
FIG. 3C
| 4 | 3 | 4 | 2 | 1 | 2 | 2 | 4 | 2 | 2 |
|---|---|---|---|---|---|---|---|---|---|
| 4 | 3 | 4 | 2 | 1 | 2 | 2 | 4 | 2 | 2 |
| 4 | 3 | 4 | 2 | 1 | 2 | 4 | 4 | 2 | 2 |
| 4 | 3 | 4 | 2 | 1 | 2 | 4 | 4 | 2 | 2 |
| 3 | 1 | 1 | 1 | 1 | 1 | 1 | 1 | 1 | 1 |
| 1 | 2 | 2 | 2 | 2 | 2 | 2 | 2 | 2 | 2 |
| 1 | 1 | 1 | 1 | 1 | 1 | 1 | 1 | 1 | 1 |
IMPORTANCE DEGREE LAYER
FIG. 3D
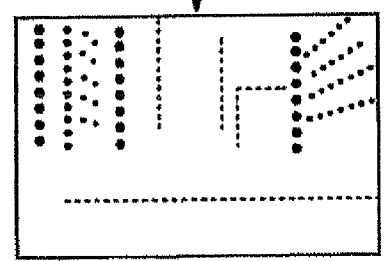
FEATURE POINT IMAGE IN WHICH WEIGHT COEFFICIENTS ARE ASSIGNED
FIG. 3E
| -1 | -1 | -1 | -1 |
|----|----|----|----|
| 1  | 1  | 1  | 1  |
| -3 | -3 | -3 | -3 |
ADJUSTMENT COEFFICIENT LAYER
FIG. 3F
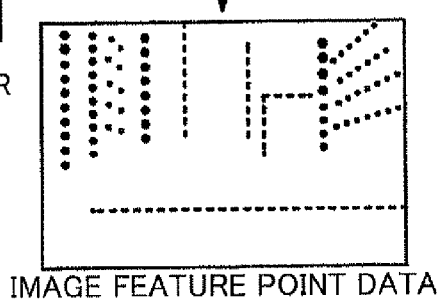
IMAGE FEATURE POINT DATA

IMAGE PROCESSING SYSTEM AND POSITION MEASUREMENT SYSTEM

INCORPORATION BY REFERENCE

The disclosure of Japanese Patent Application No. 2010-084623 filed on Mar. 31, 2010 including the specification, drawings and abstract is incorporated herein by reference in its entirety.

BACKGROUND OF THE INVENTION

1. Field of the Invention

The invention relates to an image processing system, and more particularly to an image processing system that creates reference data used for scenic image recognition processing, and a position measurement system that uses the reference data.

2. Description of the Related Art

In car navigation apparatuses, a method in which information obtained from sensors such as a gyro sensor and a geomagnetic sensor is used (an autonomous navigation method), a method in which signals from GPS satellites are used, or the combination of the autonomous navigation method and the method in which signals from GPS satellites are used has been employed as a method of calculating the current position of a vehicle. Further, for example, a position measurement apparatus described in Japanese Patent Application Publication No. 2007-108043 (JP-A-2007-108043) is known as a position measurement apparatus configured to accurately calculate the current position (refer to the paragraphs 0009 to 0013, and FIG. 1). In the position measurement apparatus, first, a tentative current position is obtained using the signals from navigation satellites, and the like. Then, the coordinates of a feature point (a vehicle coordinate system feature point) of a road marking in a coordinate system (a vehicle coordinate system) with respect to the tentative current position are calculated using the captured image of a scene ahead of the vehicle. Then, the current position of the vehicle is calculated using the calculated vehicle coordinate system feature point and the stored coordinates of the feature point of the road marking (i.e., the coordinates shown in the world coordinate system). In the position measurement apparatus, it is possible to accurately calculate the current position, even when the position measured using the signals transmitted from the navigation satellites and/or signals transmitted from various sensors includes an error.

SUMMARY OF THE INVENTION

In the position measurement apparatus described in Japanese Patent Application Publication No. 2007-108043 (JP-A-2007-108043), the space coordinates of the feature point of the road marking on a road are obtained using a stereo image, and the latitude and the longitude of the road marking having the feature point are obtained from the database of road marking information. Thus, the current position of the vehicle is calculated using the coordinates obtained using the latitude and the longitude of the road marking. Therefore, the position measurement apparatus cannot be used in an area where there is no road marking. Also, because it is necessary to compute the space coordinates of the feature point recognized through image processing, the apparatus is required to have high computing ability, which results in an increase in cost.

Accordingly, it is conceivable to employ a position calculation method in which a scenic image recognition technology is used, as a position calculation method that can be used in a road and a specific site where there is no road marking, and that does not require the calculation of the space coordinates of each feature point. In this case, it is important to create image data for reference (reference data), which is used in the scenic image recognition technology. Therefore, it is desired to implement an image processing system suitable for creating the reference data useful for the scenic image recognition, and a position measurement system that uses such reference data.

A first aspect of the invention relates to an image processing system that includes a first data input unit to which a captured image, which is obtained by capturing an image of a scene viewed from a vehicle, is input; a first feature point extraction unit that extracts image feature points from the captured image input to the first data input unit; an image-capturing situation information obtaining unit that obtains image-capturing situation information indicating a possibility that a specific subject is included in the captured image input to the first data input unit; a feature point importance degree determination unit that determines importance degrees of the image feature points extracted by the first feature point extraction unit, based on the image-capturing situation information; an image feature point data generation unit that generates image feature point data for each captured image using the image feature points extracted by the first feature point extraction unit, based on the importance degrees; and a reference data database creation unit that generates reference data used when scenic image recognition is performed, by associating the image feature point data with image-capturing attribute information, and creates a reference data database that is a database of the reference data. The image-capturing attribute information includes an image-capturing position in which the image is captured to obtain the captured image corresponding to the image feature point data.

With the above-described configuration, the image feature points are extracted from each captured image of a scene viewed from the vehicle, and the image feature point data including the extracted image feature points is associated with the image-capturing position, that is the vehicle position at the time of image capturing, to generate the reference data. Thus, the database of the reference data is created, and the reference data is used for the scenic image recognition. Also, with the above-described configuration, the importance degrees of the image feature points are determined in accordance with the image-capturing situation information that indicates the possibility that a specific subject is included in the captured image. The image feature point data is generated based on the importance degrees. Accordingly, it is possible to select the image feature points based on the importance degrees of the image feature points. Also, it is possible to perform various computations taking into account the importance degrees when the reference data is used for the image recognition processing such as pattern matching. This makes it possible to increase the accuracy of the image recognition. Further, when a specific subject is included in the captured image, it is possible to generate the reference data that makes it possible to increase the accuracy of the scenic image recognition, by changing the importance degree of the image feature point, based on whether the image feature point is in a region where the specific subject exists.

A second aspect of the invention relates to a position measurement system that includes the reference data database created by the image processing system according to the first aspect; a second data input unit to which a captured image, which is obtained by capturing an image of a scene viewed from a vehicle, is input; a second feature point extraction unit that extracts image feature points from the captured image input to the second data input unit; a captured image processing unit that generates image feature point data for each captured image using the image feature points extracted by the second feature point extraction unit, and outputs the generated image feature point data as data for matching; and a scene matching unit that performs matching between the reference data extracted from the reference data database and the data for matching, and determines a position of the vehicle based on an image-capturing position associated with the reference data that matches the data for matching.

With the above-described configuration, the reference data useful for scene matching, as described above, is used. Therefore, it is possible to appropriately determine the vehicle position.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 3A to 3F are schematic diagrams schematically showing adjustment of weight coefficients using adjustment coefficients.

DETAILED DESCRIPTION OF EMBODIMENTS

Figure 1:
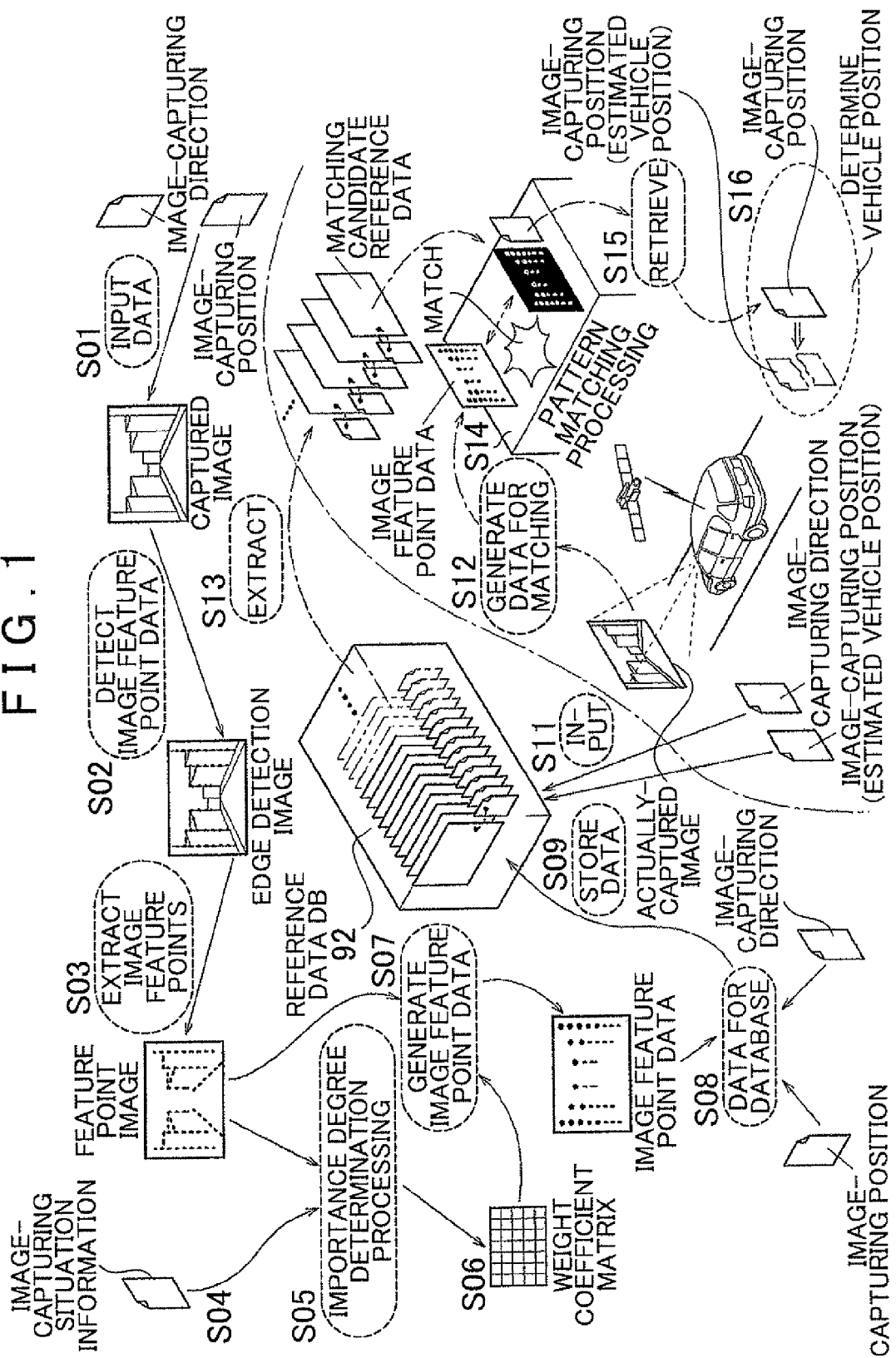
FIG. 1 is a schematic diagram used for explaining the creation of reference data by an image processing system according to an embodiment of the invention, and the basic concept of a position measurement technology in which a vehicle position is determined through matching processing using the reference data.

Hereinafter, an embodiment of the invention will be described in detail with reference to the drawings. FIG. 1 schematically shows the basic concept of a position measurement technology in which a scenic image captured by a vehicle-mounted camera is recognized through matching processing using reference data created by an image processing system according to the embodiment of the invention, so that a position at which the scenic image is captured, that is, the position of a vehicle is determined.

First, a procedure for creating a reference data database (hereinafter, simply referred to as "reference data DB") 92 will be described. As shown in FIG. 1, first, a captured image obtained by capturing an image of a scene viewed from a vehicle during travel, and image-capturing attribute information are input (step 01). The image-capturing attribute information includes an image-capturing position of the captured image and an image-capturing direction of the captured image at the time of image capturing. The term "an image-capturing position of the captured image" signifies a position at which the image is captured to obtain the captured image. The term "an image-capturing direction of the captured image" signifies a direction in which the image is captured to obtain the captured image. Then, feature point detection processing for detecting image feature points, for example, edge detection processing is performed on the input captured image (step 02). A portion, at which edge points corresponding to one or more pixels constitute one line segment, for example, an outline, is referred to as "a line segment edge". An intersection point, at which a plurality of the line segment edges intersect with each other, is referred to as "a corner". The edge points, which constitute the line segment edge, are referred to as "line segment edge points". Among the line segment edge points, the edge point corresponding to the corner is referred to as "a corner edge point". The line segment edge points and the corner edge point are examples of the image feature point. The line segment edge points including the corner edge point are extracted, as the image feature points, from an edge detection image obtained through the edge detection processing (step 03).

In processing different from the processing from step 01 to 03 (i.e., processing executed in parallel with the processing from step 01 to 03), image-capturing situation information is obtained (step 04). The image-capturing situation information indicates the possibility that a specific subject is included in the captured image. As described in detail later, the image-capturing situation information is used for the image feature points distributed in regions of the captured image, in order to make the importance degree of the image feature point in the region where the specific subject is located different from the importance degree of the image feature point in the other region. It is possible to create the reliable reference data DB 92 eventually, by decreasing the importance degree of the image feature point that is not suitable for the scenic image recognition, and/or increasing the importance degree of the image feature point that is important for the scenic image recognition, using the image-capturing situation information. The importance degree of each image feature point is determined based on the image-capturing situation information (step 05). Then, a weight coefficient matrix is generated (step 06). The weight coefficient matrix stipulates the assignment of the weight coefficients to the image feature points in accordance with the importance degrees of the image feature points. The subject to be included in the image-capturing situation information may be detected from the captured image through the image recognition processing, or may be detected by processing sensor signals from various vehicle-mounted sensors (a distance sensor, an obstacle detection sensor, and the like). Alternatively, the subject to be included in the image-capturing situation information may be detected by processing signals from outside, which are obtained from, for example, the Vehicle Information and Communication System (VICS) (Registered Trademark in Japan).

Subsequently, image feature point data is generated for each captured image, by performing processing on the image feature points based on the weight coefficients (step 07). During the process of creating the image feature point data, selection processing is performed. That is, the image feature points with the weight coefficients equal to or lower than a first threshold value are discarded, and/or the image feature points are discarded except the image feature points with the weight coefficients equal to or higher than a second threshold value and the image feature points around the image feature points with the weight coefficients equal to or higher than the second threshold value. When pattern matching is employed for the scenic image recognition, the image feature point data generated in this step is used as the pattern. Therefore, in order to achieve the high-speed performance and high accuracy of the matching, it is important that the image feature point data should include only the image feature points useful for the pattern matching for the scenic image. The generated image feature point data is associated with the image-capturing position of the captured image corresponding to the image feature point data, and/or the image-capturing direction of the captured image corresponding to the image feature point data. Thus, the generated image feature point data becomes data for a database that is searchable using the image-capturing position and/or the image-capturing direction as a search condition (step 08). That is, the image feature point data is stored in the reference data DB 92 as the reference data used for the scenic image recognition, for example, as the pattern for the pattern matching (step 09).

Next, a procedure for determining the position of the vehicle (vehicle position) while the vehicle is actually traveling using the reference data DB 92 created by the above-described procedure will be described. As shown in FIG. 1, first, an actually-captured image, which is obtained by capturing an image of a scene using the vehicle-mounted camera, and the image-capturing position and the image-capturing direction of the actually-captured image, which are used to extract the reference data from the reference data DB 92, are input (step 11). The image-capturing position input in this step is an estimated vehicle position that is estimated using, for example, a GPS measurement unit. Data for matching, which is the image feature point data, is generated from the input captured image, through the step 02 to the step 07 described above (step 12). Simultaneously, a set of the reference data regarding the image-capturing position (the estimated vehicle position) and the reference data regarding positions ahead of and behind the image-capturing position (the estimated vehicle position) is extracted as a matching candidate reference dataset, using the input image-capturing position (the estimated vehicle position) and/or the input image-capturing direction as the search condition (step 13).

Each reference data included in the extracted matching candidate reference dataset is set as the pattern, and the processing of pattern matching between each pattern and the generated data for matching is performed as the scenic image recognition (step 14). When the reference data, which is set as the pattern, matches the generated data for matching, the image-capturing position associated with the reference data that matches the generated data for matching is retrieved (step 15). The retrieved image-capturing position is determined to be a formal vehicle position, instead of the estimated vehicle position (step 16).

Figure 2:
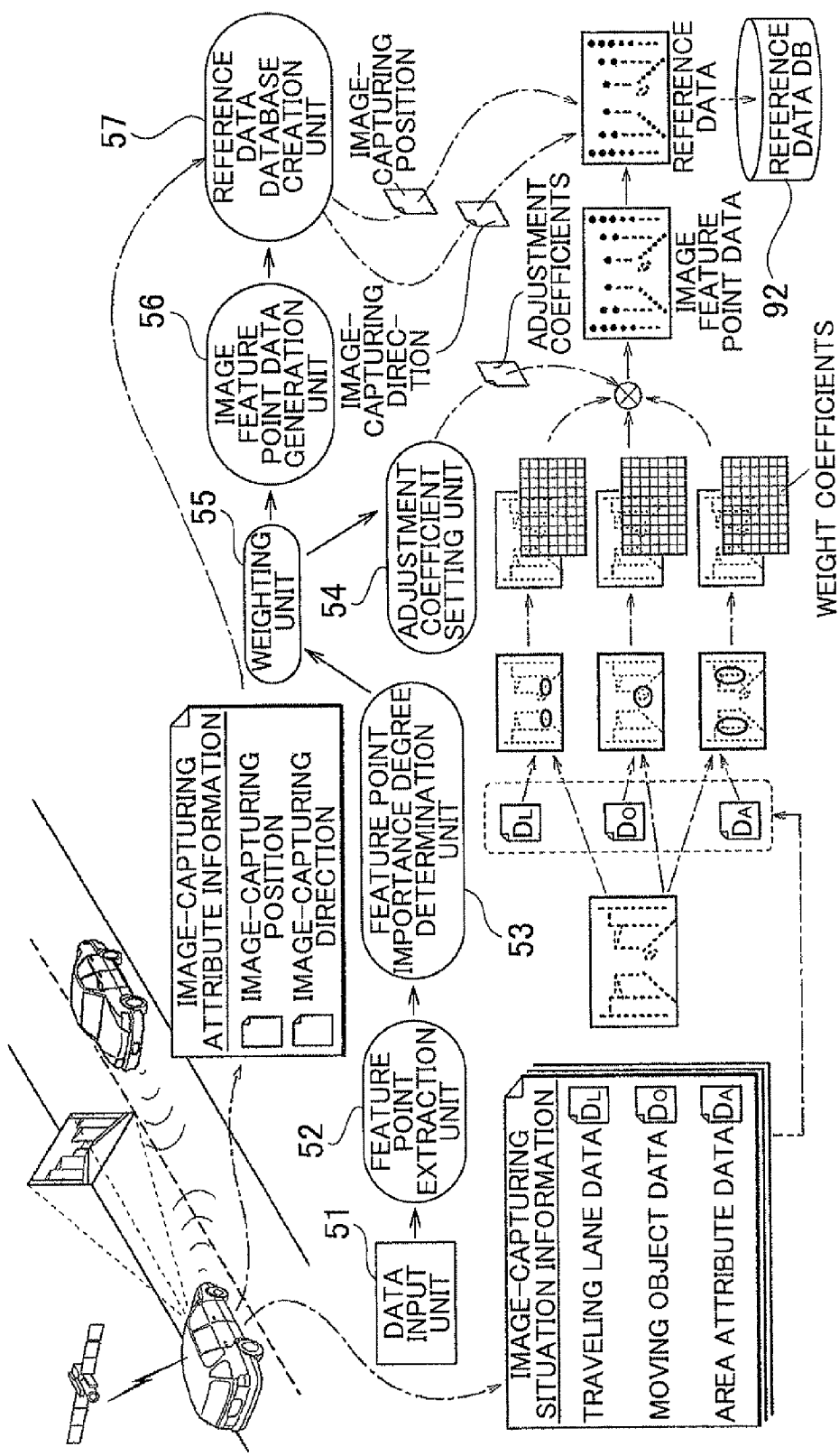
FIG. 2 is a functional block diagram showing main functions of the image processing system according to the embodiment of the invention.

Next, the image processing system according to the embodiment of the invention, which generates the reference data from the captured image based on the above-described basic concept of the position measurement technology, will be described. A functional block diagram in FIG. 2 schematically shows functions of the image processing system, which are particularly related to the embodiment of the invention.

The image processing system includes functional units, such as a data input unit 51, a feature point extraction unit 52, a feature point importance degree determination unit 53, a weighting unit 55, an adjustment coefficient setting unit 54, an image feature point data generation unit 56, and a reference data database creation unit 57. Each of the functions may be implemented by hardware, software, or combination of hardware and software.

The captured image obtained by capturing an image of a scene using the camera provided in a vehicle, the image-capturing attribute information including the image-capturing position and the image-capturing direction at the time of image capturing, and the image-capturing situation information are input to the data input unit 51. The vehicle may be a vehicle that is traveling for the purpose of creating the reference data. In an example in which the image processing system is provided in the vehicle, the captured image, the image-capturing attribute information, and the image-capturing situation information are input to the data input unit 51 in real time. However, in an example in which the image processing system is installed in a data processing center or the like, the captured image, the image-capturing attribute information, and the image-capturing situation information are temporarily stored in a storage medium, and these data are input to the data input unit 51 in a batch processing manner. Methods of generating the captured image and the image-capturing attribute information are known, and therefore, the description thereof is omitted.

The image-capturing situation information is information indicating the possibility that a specific subject is included in the captured image. Examples of the specific subject include objects that define a traveling lane in which the vehicle travels, such as a guide rail and a groove at a road shoulder, moving objects such as a nearby traveling vehicle, an oncoming vehicle, a bicycle, and a pedestrian, and scenic objects that are the features of a mountainous area, a suburban area, an urban area, a high-rise building area, and the like, such as a mountain and a building. In the embodiment, the contents of the image-capturing situation information include traveling lane data $D_L$, moving object data $D_O$, and area attribute data $D_A$. The traveling lane data $D_L$ is data that shows a region of the traveling lane, and a region outside a road, in the captured image. The traveling lane data $D_L$ is obtained based on the result of recognition of white lines, a guardrail, and a safety zone. The white lines, the guide rail, and the safety zone are recognized through the image processing performed on the captured image. The moving object data $D_O$ is data that shows a region where a moving object near the vehicle exists in the captured image. The moving object near the vehicle is recognized by a vehicle-mounted sensor that detects an obstacle, such as a radar. The area attribute data $D_A$ is data that shows the type of an image-capturing area in which the captured image is obtained by capturing the image, that is, an area attribute of the image-capturing area. Examples of the area attribute include a mountainous area, a suburban area, an urban area, and a high-rise building area. The type, that is, the area attribute of the image-capturing area is recognized based on the vehicle position when the captured image is obtained by capturing the image, and map data.

The feature point extraction unit 52 extracts the edge points from the captured image, as the image feature points, using an appropriate operator. The feature point importance degree determination unit 53 determines the importance degrees of the image feature points extracted by the feature point extraction unit 52, based on the contents of each data included in the image-capturing situation information. For example, when the contents of the traveling lane data $D_L$ are used, a high importance degree is assigned to the image feature point in a road shoulder-side region outside the traveling lane in the captured image, as compared to an importance degree assigned to the image feature point in a region inside the traveling lane in the captured image. When the moving object data $D_O$ is used, a low importance degree is assigned to the image feature point in a region where a moving object exists in the captured image, as compared to an importance degree assigned to the image feature point in a region where the moving object does not exist in the captured image. Further, when the contents of the area attribute data $D_A$ are used, a rule for assigning the importance degrees to the image feature points in accordance with the positions of the image feature points in the captured image is changed in accordance with the above-described area attribute. For example, in the captured image of a mountainous area, because there is a high possibility that there is sky above a central optical axis for image capturing, and there are woods on the right and left sides of the central optical axis for image capturing, a high importance degree is assigned to the image feature point in a center region around the central optical axis for image capturing, as compared to an importance degree assigned to the image feature point in a region other than the central region. In the captured image of a suburban area, because there is not much traffic, and there are structural objects such as houses around, a high importance degree is assigned to the image feature point in a region below the central optical axis for image capturing, as compared to an importance degree assigned to the image feature point in a region above the central optical axis for image capturing. In the captured image of an urban area, because there is much traffic, a high importance degree is assigned to the image feature point in a region above the central optical axis for image capturing, as compared to a region below the central optical axis for image capturing. In the captured image of a high-rise building area, because there are many elevated roads and elevated bridges, a high importance degree is assigned to the image feature point in a region above the central optical axis for image capturing, as compared to a region below the central optical axis for image capturing.

The weighting unit 55 assigns weight coefficients to the image feature points in accordance with the importance degrees assigned by the feature point importance degree determination unit 53. Because a high importance degree is assigned to the image feature point that is considered to be important for performing accurate image recognition (accurate pattern matching), a high weight coefficient is assigned to the image feature point to which a high importance degree has been assigned. On the other hand, taking into account that there is a high possibility that the image feature point, to which a low importance degree has been assigned, is not used for the actual image recognition, or is deleted from the reference data, a low weight coefficient is assigned to the image feature point to which a low importance degree has been assigned so that the low weight coefficient is used for determining whether to select or delete the image feature point.

The adjustment coefficient setting unit 54 calculates adjustment coefficients used for changing the weight coefficients assigned by the weighting unit 55, in view of the distribution state of the weight coefficients in the captured image. The importance degrees, which have been assigned to the image feature points extracted by the feature point extraction unit 52 based on the image-capturing situation information, include certain errors. As a result, there is considered to be a possibility that the image feature points, to which high importance degrees have been assigned, are randomly distributed. Therefore, when the image feature points to which high importance degrees have been assigned are unevenly distributed, in other words, when the image feature points to which high weight coefficients have been assigned by the weighting unit 55 are unevenly distributed, the adjustment coefficient setting unit 54 is used to make the distribution less uneven. When the dispersion of the image feature points obtained through the computation processing indicates that the image feature points to which the high weight coefficients have been assigned are unevenly distributed, the adjustment coefficient is set to increase the weight coefficient(s) of the image feature points in a region where the density of the image feature points to which the high weight coefficients have been assigned is low, and the adjustment coefficient is set to decrease the weight coefficient(s) of the image feature points in a region where the density of the image feature points to which the high weight coefficients have been assigned is high.

The image feature point data generation unit 56 generates the image feature point data for each captured imaged, by performing processing on the image feature points based on the weight coefficients assigned by the weighting unit 55, or based on the weight coefficients and the assigned adjustment coefficients in some cases. When generating the image feature point data, the number of the image feature points may be reduced to efficiently perform the matching processing, by deleting the image feature points with the weighting coefficients equal to or lower than a threshold value. Also, the image feature point data may be provided with the weight coefficients so that the weight coefficients are associated with the image feature points in the reference data as well, and the weight coefficients are used for calculating weighted similarity when the pattern matching processing is performed.

The processing of distributing the image feature points in the image feature point data over an entire region of the captured image as widely as possible using the above-described adjustment coefficients will be described with reference to a schematic explanatory diagram shown in FIGS. 3A to 3F. A feature point image (FIG. 3B) is generated by extracting the image feature points from the captured image (FIG. 3A). The importance degree is assigned to each image feature point in the feature point image. FIG. 3C shows the importance degrees corresponding to the image feature points in the form of an importance degree layer corresponding to the feature point image, in order to make it possible to schematically understand how the importance degrees are assigned. The weighting coefficient is assigned to each image feature point using the importance degree layer. FIG. 3D shows the image feature points to which the weight coefficients have been assigned, in the form of the feature point image in which the size of the image feature point increases as the weight coefficient of the image feature point increases. If processing is performed on the image feature points, for example, to delete the image feature points to which the weight coefficients equal to or lower than the threshold value have been assigned, that is, for example, if the image feature points other than the large-sized image feature points in FIG. 3D are deleted, the image feature points located in a lower region in the feature point image are removed. As a result, the remaining image feature points (that is, the image feature points in the image feature point data) may be extremely unevenly distributed. In order to avoid the uneven distribution of the image feature points, the degree of distribution of the image feature points in the feature point image is calculated, and the adjustment coefficients are set to increase the weight coefficient(s) of the image feature points in a region where the density of the remaining image feature points is low as a result of performing processing on the image feature points. In order to make it possible to schematically understand the adjustment coefficients that are set in the above-described manner, FIG. 3E shows groups of the adjustment coefficients in the form of an adjustment coefficient layer corresponding to the feature point image. In the adjustment coefficient layer, the adjustment coefficients are arranged in a matrix manner (i.e., the adjustment coefficient is assigned to each section composed of a plurality of pixel regions). The image feature point data generation unit 56 performs processing on the image feature points using the weight coefficients and the weight coefficients that are finally set based on the adjustment coefficients, thereby generating the image feature point data shown in FIG. 3F for each captured image.

The reference data database creation unit 57 creates the reference data that is used for the scenic image recognition by associating the image feature point data generated by the image feature point data generation unit 56 with the image-capturing attribute information regarding the captured image corresponding to the image feature point data, and creates the database of the reference data. Thus, the reference data database creation unit 57 creates the database of the reference data. That is, the reference data is stored in the reference data DB 92.

The example, in which the importance degree of each image feature point is determined, and as a result, the weight coefficient of each image feature point is set, has been described above. However, the processing may be performed for each image feature point group. In this case, for example, the region of the captured image may be divided into a plurality of image sections, and the feature point importance degree determination unit 53 may divide the image feature points into image feature point groups so that each image feature point group includes the image feature points in the same image section, and may perform the processing for each image feature point group. In this case, the feature point importance degree determination unit 53 may assign the same importance degree to the image feature points included in the same image feature point group. Similarly, the weighting unit 55 may set the weight coefficient for each image feature point group. In this case, the image sections may be set in a manner such that each image section is composed of one pixel included in the captured image, or each image section is composed of a plurality of pixels. Thus, in the embodiment of the invention, each image section may be composed of one or more pixels.

Figure 4:
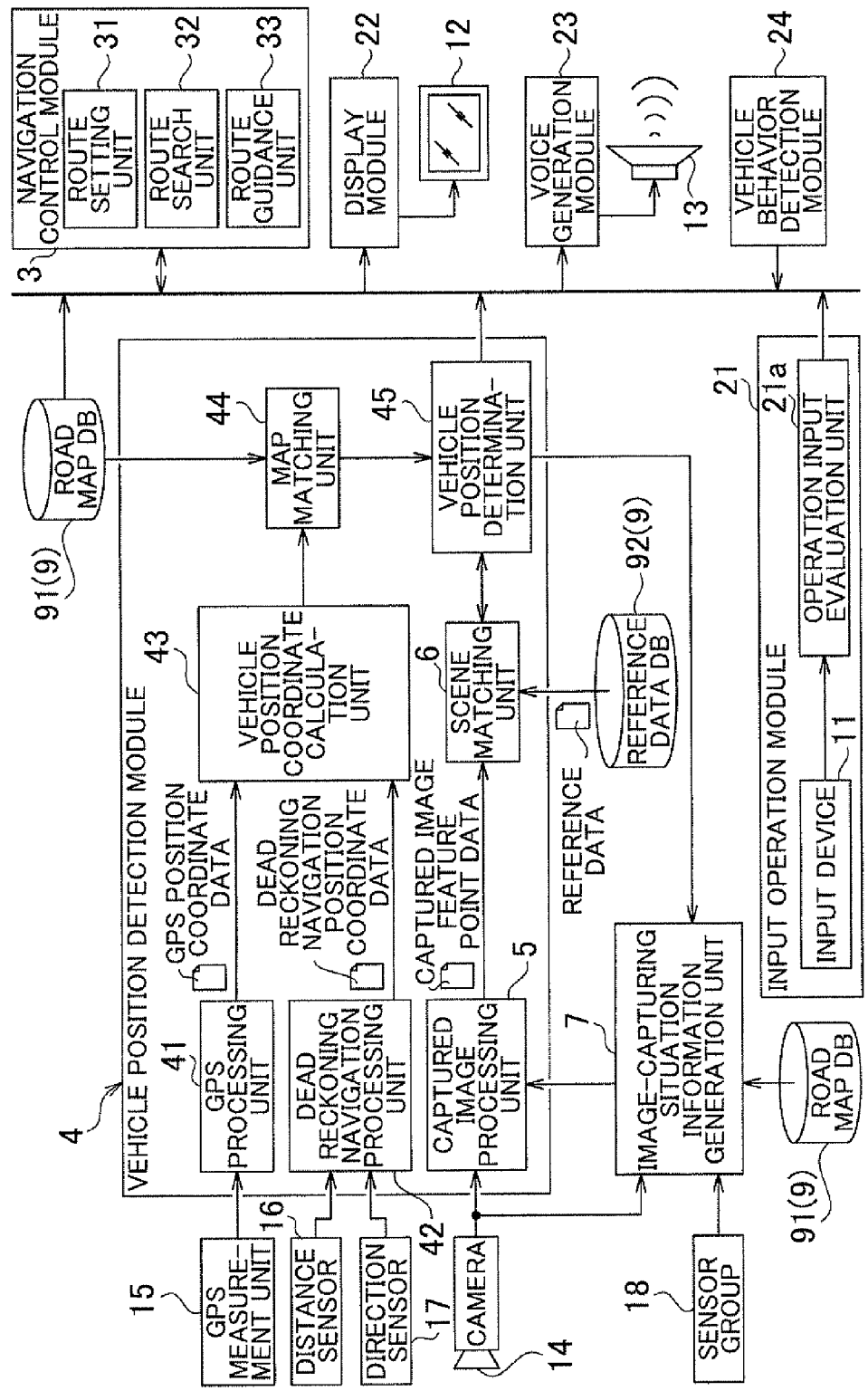
FIG. 4 shows functional blocks of a car navigation system that uses a reference data database created by the image processing system according to the embodiment of the invention.

Next, a vehicle-mounted car navigation system, which corrects the vehicle position by performing the scenic image recognition (the image feature point pattern matching) using the reference data DB 92 created by the above-described image processing system, will be described. FIG. 4 shows functional blocks in an example in which the car navigation system is installed in a vehicle-mounted LAN. The car navigation system includes an input operation module 21, a navigation control module 3, a vehicle position detection module 4, an image-capturing situation information generation unit 7, and a database 9 including the above-described reference data DB 92 and a road map database (hereinafter, simply referred to as "road map DB") 91 in which road map data for car navigation is stored.

The navigation control module 3 includes a route setting unit 31, a route search unit 32, and a route guidance unit 33. For example, the route setting unit 31 sets a departure point such as the current vehicle position, a destination that has been input, and pass-through points, and a traveling condition (for example, a condition as to whether an expressway is to be used). The route search unit 32 is a processing unit that performs computation processing for searching for a guidance route from the departure point to the destination based on the condition set by the route setting unit 31. The route guidance unit 33 is a processing unit that performs computation processing for providing appropriate route guidance to a driver in accordance with the route from the departure point to the destination, which is retrieved by the route search unit 32 as a result of searching. The route guidance unit 33 provides the route guidance, using guidance displayed on the screen of a monitor 12, voice guidance output from a speaker 13, and the like.

The vehicle position detection module 4 has a function of correcting the estimated vehicle position obtained by performing conventional position calculation using the GPS and performing conventional position calculation using dead reckoning navigation. The vehicle position detection module 4 corrects the estimated vehicle position based on the vehicle position determined by the scenic image recognition using the estimated vehicle position. The vehicle position detection module 4 includes a GPS processing unit 41, a dead reckoning navigation processing unit 42, a vehicle position coordinate calculation unit 43, a map matching unit 44, a vehicle position determination unit 45, a captured image processing unit 5, and a scene matching unit 6. The GPS processing unit 41 is connected to a GPS measurement unit 15 that receives GPS signals from GPS satellites. The GPS processing unit 41 analyzes the signals from the GPS satellites received by the GPS measurement unit 15, calculates the current position of the vehicle (i.e., the latitude and the longitude), and transmits the current position of the vehicle to the vehicle position coordinate calculation unit 43 as GPS position coordinate data. The dead reckoning navigation processing unit 42 is connected to a distance sensor 16 and a direction sensor 17. The distance sensor 16 is a sensor that detects the speed and the moving distance of the vehicle. For example, the distance sensor 16 includes a vehicle speed pulse sensor that outputs a pulse signal each time the drive shaft, the wheel, or the like of the vehicle rotates by a certain amount, a yaw rate/acceleration sensor that detects the acceleration of the vehicle, and a circuit that integrates the detected values of the acceleration. The distance sensor 16 outputs information on the speed of the vehicle and information on the moving distance of the vehicle, which are the results of detection, to the dead reckoning navigation processing unit 42. For example, the direction sensor 17 includes a gyro sensor, a geomagnetic sensor, an optical rotation sensor and a rotary variable resistor that are attached to the rotational unit of a steering wheel, and an angle sensor attached to a wheel unit. The direction sensor 17 outputs information on the direction, which is the result of detection, to the dead reckoning navigation processing unit 42. The dead reckoning navigation processing unit 42 computes dead reckoning navigation position coordinates based on the moving distance information and the direction information, which are transmitted to the dead reckoning navigation processing unit 42 at every moment, and transmits the computed dead reckoning navigation position coordinates to the vehicle position coordinate calculation unit 43 as the dead reckoning navigation position coordinate data. The vehicle position coordinate calculation unit 43 performs computation processing to determine the coordinates of the vehicle position based on the GPS position coordinate data and the dead reckoning navigation position coordinate data, using a known method. The calculated vehicle position information includes a measurement error and the like. Therefore, the calculated vehicle position may deviate from a road in some cases. Thus, the map matching unit 44 adjusts the vehicle position information so that the vehicle is positioned on a road shown in the road map. The coordinates of the vehicle position are transmitted to the vehicle position determination unit 45 as the estimated vehicle position.

The captured image processing unit 5 substantially includes most of functional units that constitute the image processing system shown in FIG. 2. The captured image processing unit 5 includes the data input unit 51, the feature point extraction unit 52, the feature point importance degree determination unit 53, the weighting unit 55, the adjustment coefficient setting unit 54, and the image feature point data generation unit 56. When the captured image of a scene ahead of the vehicle, which is the image captured by the vehicle-mounted camera 14, is input to the data input unit 51, the image feature point data is output from the image feature point data generation unit 56 through the above-described steps. The image-capturing situation information used by the feature point importance degree determination unit 53 is generated by the image-capturing situation information generation unit 7 provided in the vehicle, and transmitted to the captured image processing unit 5. The image-capturing situation information generation unit 7 is connected to the vehicle-mounted camera 14 in order to generate the above-described traveling lane data $D_L$, and the image-capturing situation information generation unit 7 receives the captured image that is the same as the captured image transmitted to the captured image processing unit 5. The traveling lane data $D_L$ is created by performing image processing on the received captured image, using a known algorithm. The image-capturing situation information generation unit 7 is connected to a sensor group 18 for detecting an obstacle, in order to create the above-described moving object data $D_O$. The image-capturing situation information generation unit 7 creates the moving object data $D_O$ based on sensor information transmitted from the sensor group 18. Further, the image-capturing situation information generation unit 7 is connected to the vehicle position determination unit 45 and the database 9, in order to create the above-described area attribute data $D_A$. The image-capturing situation information generation unit 7 obtains the area attribute of an area where the vehicle is currently traveling, by searching the database 9 using the coordinates of the vehicle position transmitted from the vehicle position determination unit 45 as a search condition. Examples of the area attribute include a mountainous area and an urban area. The image-capturing situation information generation unit 7 creates the area attribute data $D_A$ based on the obtained area attribute.

The scene matching unit 6 performs the pattern matching processing on the image feature point data transmitted from the captured image processing unit 5, using, as the pattern, the reference data extracted from the reference data DB 92 based on the estimated vehicle position transmitted from the vehicle position determination unit 45. When the reference data matches the image feature point data, the image-capturing position associated with the matching reference data is retrieved. The retrieved image-capturing position is transmitted to the vehicle position determination unit 45, as the vehicle position. The vehicle position determination unit 45 corrects the vehicle position, that is, replaces the estimated vehicle position with the transmitted vehicle position.

The car navigation system further includes, as peripheral devices, an input operation module 21, a display module 22, a voice generation module 23, and a vehicle behavior detection module 24. The input operation module 21 includes an input device 11 including a touch panel and a switch; and an operation input evaluation unit 21a that transforms an operation input through the input device 11 to an appropriate operation signal, and transmits the operation signal to the car navigation system. The display module 22 causes the monitor 12 to display image information necessary for car navigation. The voice generation module 23 causes the speaker 13 and a buzzer to output voice information necessary for car navigation. The vehicle behavior detection module 24 detects various behaviors of the vehicle, such as a braking behavior, an accelerating behavior, and a steering behavior of the vehicle, based on behavior data transmitted through the vehicle-mounted LAN.

It is preferable that the image-capturing situation information may include the result of recognition of the traveling lane in which the vehicle travels; and a high importance degree may be assigned to the image feature point in the road shoulder-side region outside the traveling lane in the captured image, as compared to an importance degree assigned to the image feature point in the region inside the traveling lane in the captured image, as in the above-described embodiment. With this configuration, it is possible to increase the importance degree of the image feature point extracted from a subject that is not much changed over time (i.e., an artificial object or a natural object disposed at the side of the road), and to decrease the importance degree of the image feature point extracted from a subject that is greatly changed over time (i.e., an object that exists in the traveling lane, and therefore, is likely to be removed in a short period), in the captured image of a scene. Thus, it is possible to create the image feature point data that is regarded as valuable reference data to be stored in the database, and that includes the image feature points that are stably used over time. That is, it is possible to create the database of the valuable reference data.

It is preferable that the image-capturing situation information may include the result of recognition of a moving object existing near the vehicle by the vehicle-mounted sensor; and a low importance degree may be assigned to the image feature point in the region where the moving object exists in the captured image, as compared to an importance degree assigned to the image feature point in the region where the moving object does not exist in the captured image, as in the above-described embodiment. The image feature point extracted from the image corresponding to the moving object is regarded as noise when the image feature point data is used as the reference data for the scenic image recognition. With the above-described configuration, it is possible to decrease the importance degree of the image feature point in the region where the moving object exists. Thus, it is possible to delete the image feature point in the region where the moving object exists, and to create the reliable reference data.

Further, it is preferable that the image-capturing situation information may include the area attribute of the image-capturing area, which is recognized based on the vehicle position when the captured image is obtained by capturing the image, and the map data; and the rule for assigning the importance degrees to the image feature points in accordance with the positions of the image feature points in the captured image may be changed in accordance with the area attribute, as in the above-described embodiment. With this configuration, it is possible to estimate a region in the captured image, where there is an object that is not changed over time, and is useful for determining an area, in accordance with the area attribute of the image-capturing area. Examples of the area attribute include a mountainous area, a suburban area, an urban area, and a high-rise building area. Accordingly, it is possible to increase the importance degree of the image feature point extracted from the estimated region, and to decrease the importance degree of the image feature point in the other region. Thus, it is possible to create the reliable reference data.

It is preferable that the image feature point may be a point in the image, which is stably detected. Therefore, the edge point detected using an edge detection filter or the like is generally used. Edge point groups, which constitute linear edges showing the outline of a building, the outline of the window of a building, and the outlines of various billboards, are appropriate image feature points used in the embodiment of the invention. Accordingly, in the embodiment of the invention, it is preferable that the image feature points extracted by the feature point extraction unit 52 may be the edge points, and when the edge points are straight line component edge points that form a straight line, it is preferable that a high importance degree may be assigned to the straight line component edge points, as compared to an importance degree assigned to the edge points other than the straight line component edge points. With this configuration, it is possible to create the reference data that makes it possible to recognize a specific artificial object that is the feature of a scene, such as a building or a billboard, in an accurate and simple manner. In this case, it is preferable that a high importance degree may be assigned to an intersection edge point among the straight line component edge points, as compared to an importance degree assigned to the straight line component edge points other than the intersection edge point. The intersection edge point is the intersection of two straight line components. Thus, it is possible to limit the image feature points included in the reference data, to the corners, that is, the intersection edge points that are the most important feature points in a building, a bridge, a billboard, and the like. Thus, it is possible to reduce a computation load in the image recognition. Note that the intersection edge points may be detected using, for example, the Harris operator.

In the above-described embodiment, among the edge points obtained as the image feature points through the edge detection processing, particularly, the line segment edge points (the straight line component edge points) that constitute one line segment, and the corner edge point (the intersection edge point) are treated as the useful image feature points. The corner edge point (the intersection edge point) corresponds to the intersection at which the line segments intersect with each other, preferably, the line segments are substantially orthogonal to each other. However, the image feature points used in the invention are not limited to such edge points. The image feature points useful for a scene may be used. For example, the typical edge points that form a geometric shape, such as a circle and a rectangle, may be used (when the geometric shape is a circle, the typical edge points may be three points on the circumference of the circle), or the gravity center of a geometric shape or a point indicating the gravity center of the geometric shape in the image may be used. Also, it is preferable to employ an edge intensity as a factor used for calculating the importance degree. For example, when a line segment is composed of an edge with a high intensity, the starting point and the ending point of the line segment may be treated as the image feature points to which a high importance degree is assigned, as compared to an importance degree assigned to the edge points other than the starting point and the ending point. Also, specific points in a characteristic geometric shape, for example, end points in a symmetrical object may be treated as the image feature points to which a high importance degree is assigned, as compared to an importance degree assigned to the edge points other than the end points.

Further, in addition to the edge points obtained through the edge detection processing, a point at which a hue and/or a chroma greatly change(s) in the captured image may be employed as the image feature point. Similarly, as the image feature point based on color information, the end point of an object with a high color temperature may be treated as the image feature point with a high importance degree.

That is, any image feature points may be used in the embodiment of the invention, as long as the image feature points are useful for the determination as to the degree of similarity between the reference data and the image feature point data generated based on the actually-captured image, for example, the pattern matching.

In the above-described embodiment, the weight coefficient, which is calculated separately from the importance degree, is assigned to each image feature point in accordance with the importance degree of the image feature point. However, the importance degree may be used as the weight coefficient.

In order to simplify the processing of assigning the importance degrees to the image feature points, the captured image may be divided into a plurality of sections, the importance degree of each section may be determined, and the same importance degree may be assigned to the image feature points in the same section, instead of individually assigning the importance degree to each image feature point.

When the scenic image recognition is performed through the processing of matching between the reference data created and stored in the database by the image processing system, and the image feature point data extracted from the captured image obtained in real time, it may be convenient to provide the importance degrees to the reference data, that is, to associate the importance degrees with the reference data, depending on the manner in which the reference data is used. Therefore, the reference data may include the importance degrees associated with the image feature points.

In the above-described embodiment, the reference data stored in the reference data DB 92 is associated with the image-capturing position and the image-capturing direction (the direction of the optical axis of the camera). The reference data may be associated with the above-described image-capturing situation information, a date on which the image is captured, a weather at the time of image capturing, and the like, in addition to the image-capturing position and the image-capturing direction.

The image-capturing position needs to be indicated by at least two-dimensional data such as data including the latitude and the longitude. The image-capturing position may be indicated by three-dimensional data including the latitude, the longitude, and the altitude.

The image-capturing direction does not necessarily need to be associated with the reference data. For example, in the case where it is ensured that when the reference data is created, the image is captured in a direction with respect to a road on which the vehicle is traveling, which is substantially the same as a direction in which the image is captured when the scenic image recognition is performed using the reference data, the image-capturing direction does not need to be associated with the reference data.

In the case where the image-capturing direction is associated with the reference data, and a plurality of reference data may be prepared by appropriately changing the image-capturing direction from one basic image-capturing direction, the direction in which the vehicle is traveling may be calculated based on information transmitted from the direction sensor and the like, and only the reference data, whose image-capturing direction coincides with the direction in which the vehicle is traveling, may be used for the scenic image recognition. Thus, when the image-capturing attribute information includes the image-capturing direction as described above, it is possible to reduce the amount of the reference data used for the matching, by specifying the image-capturing direction.

The most appropriate vehicle-mounted camera used in the embodiment of the invention is a camera that captures an image of a scene ahead of the vehicle in the direction in which the vehicle is traveling. However, the vehicle-mounted camera may be a camera that captures an image of a scene at a position obliquely ahead of the vehicle, or a camera that captures an image of a scene on the side of the vehicle, or an image of a scene behind the vehicle. That is, the captured image used in the invention is not limited to an image of a scene ahead of the vehicle in the direction in which the vehicle is traveling.

In the functional block diagram used to describe the above embodiment, the functional units are separated from each other so that the description is easily understandable. However, the invention is not limited to the case where the functional units are separated from each other as shown in the functional block diagram. At least two of the functional units may be freely combined with each other, and/or one functional unit may be further divided.

The image processing system according to the embodiment of the invention may be applied not only to car navigation, but also to a technical field in which the current position and the current direction are measured through the scenic image recognition.

What is claimed is:

1. An image processing system comprising:
   a first data input unit to which a captured image, which is obtained by capturing an image of a scene viewed from a vehicle, is input;
   a first feature point extraction unit that extracts image feature points from the captured image input to the first data input unit;
   an image-capturing situation information obtaining unit that obtains image-capturing situation information indicating a possibility that a specific subject is included in the captured image input to the first data input unit;
   a feature point importance degree determination unit that assigns one of a plurality of importance degrees to each of the image feature points extracted by the first feature point extraction unit, based on the image-capturing situation information, each of the plurality of importance degrees corresponding to a different importance level;
   an image feature point data generation unit that generates image feature point data for each captured image using the image feature points extracted by the first feature point extraction unit, based on the importance degrees, the generated image feature point data including important ones of the extracted image feature points and excluding unimportant ones of the extracted image feature points, the importance of each extracted image feature point being determined by the importance degree of the extracted image feature point; and
   a reference data database creation unit that generates reference data used when scenic image recognition is performed, by associating the image feature point data with image-capturing attribute information, and creates a reference data database that is a database of the reference data, wherein the image-capturing attribute information includes an image-capturing position at which the image is captured to obtain the captured image corresponding to the image feature point data, the image feature point data in the reference data database being searchable using the image-capturing position.

2. The image processing system according to claim 1, wherein
   the image-capturing situation information includes a result of recognition of a traveling lane in which the vehicle travels; and
   the feature point importance degree determination unit assigns a high importance degree to the image feature point in a road shoulder-side region outside the traveling lane in the captured image, as compared to an importance degree assigned to the image feature point in a region inside the traveling lane in the captured image.

3. The image processing system according to claim 1, wherein
   the image-capturing situation information includes a result of recognition of a moving object existing near the vehicle by a vehicle-mounted sensor; and
   the feature point importance degree determination unit assigns a low importance degree to the image feature point in a region where the moving object exists in the captured image, as compared to an importance degree assigned to the image feature point in a region where the moving object does not exist in the captured image.

4. The image processing system according to claim 1, wherein
   the image-capturing situation information includes an area attribute of an image-capturing area, which is recognized based on a position of the vehicle when the captured image is obtained by capturing the image, and map data;
   the feature point importance degree determination unit changes a rule in accordance with the area attribute; and
   the rule is used to assign the importance degrees to the image feature points in accordance with positions of the image feature points in the captured image.

5. The image, processing system according to claim 1, wherein
   the image feature points extracted by the feature point extraction unit are edge points; and
   when the edge points are straight line component edge points that form a straight line, the feature point importance degree determination unit assigns a high importance degree to the straight line component edge points, as compared to an importance degree assigned to the edge points other than the straight line component edge points.

6. The image processing system according to claim 5, wherein
   the feature point importance degree determination unit assigns a high importance degree to an intersection edge point among the straight line component edge points, as compared to an importance degree assigned to the straight line component edge points other than the intersection edge point, and the intersection edge point is an intersection of two straight line components.

7. The image processing system according to claim 1, wherein
   the captured image is divided into a plurality of sections; and
   the feature point importance degree determination unit assigns the same importance degree to the image feature points in the same section.

8. The image processing system according to claim 1, wherein
   the reference data includes the importance degrees that are associated with the image feature points, respectively.

9. The image processing system according to claim 1, wherein
   the image-capturing attribute information further includes an image-capturing direction in which the image is captured to obtain the captured image.

10. A position measurement system comprising:
    the reference data database created by the image processing system according to claim 1;
    a second data input unit to which a captured image, which is obtained by capturing an image of a scene viewed from a vehicle, is input;
    a second feature point extraction unit that extracts image feature points from the captured image input to the second data input unit;
    a captured image processing unit that generates image feature point data for each captured image using the image feature points extracted by the second feature point extraction unit, and outputs the generated image feature point data as data for matching; and
    a scene matching unit that performs matching between the reference data extracted from the reference data database and the data for matching, and determines a position of the vehicle based on an image-capturing position associated with the reference data that matches the data for matching.

11. The image processing system according to claim 1, wherein:
the image feature point data generation unit generates the image feature point data for each captured image by:
comparing an importance value of each extracted image feature point with an importance threshold, the importance value of each extracted image feature point being determined by the importance degree of the extracted image feature point; and
including in the image feature point data only those extracted image feature points having an importance value greater than or equal to a predetermined importance value.

* * * * *